(12) United States Patent
Lee et al.

(10) Patent No.: US 12,617,947 B2
(45) Date of Patent: *May 5, 2026

(54) FLAME-RETARDANT FLEXIBLE COATING COMPOSITION, FLAME-RETARDANT PRODUCT HAVING FLAME-RETARDANT FLEXIBLE COATING LAYER AND METHOD FOR MANUFACTURING THE SAME

(71) Applicant: AXEED Inc., Mokpo-si (KR)

(72) Inventors: Chang Ho Lee, Seoul (KR); Ki Hwan An, Incheon (KR)

(73) Assignee: AXEED INC., Mokpo-si (KR)

( * ) Notice: Subject to any disclaimer, the term of this patent is extended or adjusted under 35 U.S.C. 154(b) by 534 days.

This patent is subject to a terminal disclaimer.

(21) Appl. No.: 18/105,295

(22) Filed: Feb. 3, 2023

(65) Prior Publication Data

US 2024/0076508 A1 Mar. 7, 2024

(30) Foreign Application Priority Data

Sep. 5, 2022 (KR) ........................ 10-2022-0112378

(51) Int. Cl.
*C09D 5/18* (2006.01)
*C09D 7/63* (2018.01)
*C09D 183/06* (2006.01)

(52) U.S. Cl.
CPC .................. *C09D 5/18* (2013.01); *C09D 7/63* (2018.01); *C09D 183/06* (2013.01)

(58) Field of Classification Search
CPC .......... C09D 5/18; C09D 7/63; C09D 183/06; C09D 183/04; C08G 77/14; C08G 77/80; C08G 77/18; B05D 3/0413; C08K 5/0066; C08K 5/521
See application file for complete search history.

(56) References Cited

U.S. PATENT DOCUMENTS

2006/0029811 A1* 2/2006 Sugioka ............... H05K 1/0373
428/413

FOREIGN PATENT DOCUMENTS

| | | | | | |
|---|---|---|---|---|---|
| CN | 106049064 | A | * | 10/2016 | ............. D06M 11/72 |
| CN | 106049064 | B | * | 1/2018 | .......... D06M 15/263 |
| JP | 2002053739 | A | * | 2/2002 | |
| JP | 2004176442 | A | * | 6/2004 | ............. D06M 11/72 |
| JP | 3914390 | B2 | * | 5/2007 | ........... C08K 5/5415 |
| KR | 20020029639 | A | * | 4/2002 | ............... C08K 9/06 |
| KR | 20050102408 | A | * | 10/2005 | |
| KR | 20070036693 | A | * | 4/2007 | ............... C08K 5/54 |
| KR | 20130093250 | A | * | 8/2013 | ............. C08L 83/04 |
| WO | WO-2005078012 | A2 | * | 8/2005 | ............... C08K 3/36 |

OTHER PUBLICATIONS

KR20050102408A Machine translation (Year: 2005).*
KR20130093259A Machine Translation (Year: 2013).*
JP2004176442A Machine Translation (Year: 2004).*
JP3914390B2 Machine Translation (Year: 2007).*

* cited by examiner

*Primary Examiner* — Pamela H Weiss
(74) *Attorney, Agent, or Firm* — LEX IP MEISTER, PLLC

(57) ABSTRACT

A first task of the invention is to provide a flame-retardant flexible coating composition for a coating layer applied onto a surface of a product to satisfy both high flame retardancy and high flexibility. In an effort to achieve the task, a first aspect of the invention may provide a flame-retardant coating composition including a siloxane binder containing at least any one of an epoxy group or a dimethyl group and a phenyl group, and a phosphorus-based flame retardant.

9 Claims, No Drawings

FLAME-RETARDANT FLEXIBLE COATING COMPOSITION, FLAME-RETARDANT PRODUCT HAVING FLAME-RETARDANT FLEXIBLE COATING LAYER AND METHOD FOR MANUFACTURING THE SAME

BACKGROUND OF THE INVENTION

1. Field of the Invention

The present invention relates to a flame-retardant product having excellent flame-retardant properties, a method for manufacturing the same, and a coating composition for forming the same, and more particularly, to a coating composition including a siloxane binder containing an epoxy group or a dimethyl group and a phenyl group, and a phosphorus-based flame retardant, and a flame-retardant product using the same, and a method for manufacturing the flame-retardant product.

2. Description of the Related Art

The recent development of electric vehicles and the like has resulted in active technology development involving ensuring flame retardancy of various products. To make sure that products are provided with flame retardancy, a technique in which a flame-retardant coating composition is applied onto a surface of a product and cured is used.

As for the flame-retardant coating composition, inorganic substances or inorganic compounds have been mainly used in combination with organic binders to date. In particular, a binder using an organic material is required to be used for maintaining flexibility as being applied onto a surface of a flexible film and increasing flame retardancy. However, the use of such a binder still makes it difficult to achieve excellent flame retardancy. In addition, curing conditions are required to be maintained at high temperature, and thus there are a number of restrictions on suitable products, and in particular, it is hard to directly apply to flexible films.

SUMMARY OF THE INVENTION

A task of the invention is to provide a flame-retardant flexible coating composition for a coating layer applied onto a surface of a product to satisfy both high flame retardancy and high flexibility.

Another task of the invention is to provide a flame-retardant product having a coating layer with excellent flame retardancy and flexibility.

Another task of the invention is to provide a method for manufacturing a flame-retardant product having a coating layer with excellent flame retardancy and flexibility.

In an effort to achieve the tasks, according to a first aspect of the invention, there is provided a flame-retardant flexible coating composition including a siloxane binder containing at least any one of an epoxy group or a dimethyl group and a phenyl group, and a phosphorus-based flame retardant.

In addition, in the flame-retardant flexible coating composition according to the first aspect of the invention, the siloxane binder may further include a methyl group.

In addition, in the flame-retardant flexible coating composition according to the first aspect of the invention, the siloxane binder may be formed through a combination of a silane compound selected from the group consisting of phenylsilane, phenylmethylsilane, phenyltrimethoxysilane, phenyltriethoxysilane, diphenyldimethoxysilane, diphenyldiethoxysilane, diphenylsilanediol, triphenylsilanol, phenylmethyldimethoxysilane, phenylmethyldiethoxysilane, phenyltrichlorosilane, diphenyldichlorosilane, triphenylchlorosilane, phenylmethyldichlorosilane, and a combination thereof, and a silane compound selected from the group consisting of 3-glycidoxypropyl trimethoxy silane, 3-glycidoxypropyl triethoxy silane, 3-glycidoxypropyl methyldimethoxy silane, 3-glycidoxypropylmethyldiethoxy silane, 2-(3,4-epoxycyclohexyl)ethyl trimethoxy silane, 2-(3,4-epoxycyclohexyl)ethyl triethoxy silane, dimethyldimethoxy silane, dimethyldiethoxy silane, and a combination thereof.

In addition, in the flame-retardant flexible coating composition according to the first aspect of the invention, the phosphorus-based flame retardant may be a phosphoric acid ester compound.

In addition, in the flame-retardant flexible coating composition according to the first aspect of the invention, the siloxane binder containing the methyl group may be formed by further including either or both methyltrimethoxysilane or/and methyltriethoxysilane.

In addition, in the flame-retardant flexible coating composition according to the first aspect of the invention, the siloxane binder may be formed by further including tetraethoxysilane.

In addition, in the flame-retardant flexible coating composition according to the first aspect of the invention, the phosphorus-based flame retardant may be added in a weight of 100 to 300% with respect to a solid weight of the siloxane binder.

In addition, in the flame-retardant flexible coating composition according to the first aspect of the invention, the siloxane binder may be acidic.

In addition, in the flame-retardant flexible coating composition according to the first aspect of the invention, the siloxane binder may have a pH of 3 to 6.

According to a second aspect of the invention, there is provided a flame-retardant product formed by applying and curing the coating composition according to any one of the first aspect.

In addition, in the flame-retardant product according to the second aspect of the invention, the flame-retardant product having the flame-retardant flexible coating layer may be a film.

According to a third aspect of the invention, there is provided a method for manufacturing a flame-retardant product, which includes (a) mixing a silane compound containing at least any one of an epoxy group or a dimethyl group and a phenyl group with a first solvent to prepare a silane solution, (b) heating the silane solution to prepare a first oligomer solution, (c) diluting the first oligomer solution with a second solvent to prepare a siloxane binder, (d) dissolving or mixing a phosphorus-based flame retardant in/with the siloxane binder to prepare a coating composition, and (e) applying the coating composition onto an object and curing the applied composition.

In addition, in the method for manufacturing a flame-retardant product according to the third aspect of the invention, in the step (a), acid may be added to make the silane solution acidic.

In addition, in the method for manufacturing a flame-retardant product according to the third aspect of the invention, the curing may be performed through hot air drying at room temperature or 100° C. or less.

DETAILED DESCRIPTION OF THE EXEMPLARY EMBODIMENTS

Hereinafter, configuration and operation of embodiments of the invention will be described with reference to the accompanying drawings. In the following description, when it is determined that the specific description of the known related art unnecessarily obscures the gist of the invention, the detailed description thereof will be omitted. In addition, when an element "includes" a component, it may indicate that the element does not exclude another component unless explicitly described to the contrary, but can further include another component.

In the invention, a siloxane binder containing at least any one of an epoxy group or a dimethyl group and a phenyl group, and a phosphorus-based flame retardant may be provided.

In general, a flame retardant added to provide flame retardancy to a composition includes a metal hydrate inorganic flame retardant, a halogen compound containing bromine or chlorine, a phosphorus-based compound, a nitrogen compound, and the like. Among the flame retardants described above, the phosphorus-based compound is particularly environmentally friendly compared to other flame retardants, and thus development using the phosphorus-based compound is actively ongoing but there remains a need to overcome reduction in heat resistance.

The flame-retardant flexible coating composition including the siloxane binder provided in the invention may make up for reduced heat resistance in the phosphorus-based flame retardant. In particular, the siloxane binder in the invention is prepared through a silane compound containing at least any one of an epoxy group or a dimethyl group and a phenyl group, and the siloxane binder containing the silane compound having this combination is combined with a phosphorus-based flame retardant and may thus obtain low-temperature curing properties that are hardly seen in typical siloxane binders, and accordingly, a coating layer formed therefrom after curing has excellent flame-retardant properties as well as high hardness and flexibility to be formed on a surface of a film where flexibility is important, besides general structures, thereby providing flame retardancy.

In addition, the flame-retardant flexible coating composition according to the invention has low-temperature curing properties, and may thus cost less for a curing process than typical UV curing coating compositions or thermal curing coating compositions, and accordingly, a coating object may be less damaged to be significantly less restricted. In particular, even when the coating object is a product vulnerable to heat, such as a film, a coating layer having flame retardancy and maintaining flexibility of the film is achievable through the flame-retardant flexible coating composition according to the invention.

The siloxane binder is formed by mixing a silane compound with a solvent and making the mixture react, and the siloxane binder may be formed through a combination of a silane compound selected from the group consisting of phenylsilane, phenylmethylsilane, phenyltrimethoxysilane, phenyltriethoxysilane, diphenyldimethoxysilane, diphenyldiethoxysilane, diphenylsilanediol, triphenylsilanol, phenylmethyldimethoxysilane, phenylmethyldiethoxysilane, phenyltrichlorosilane, diphenyldichlorosilane, triphenylchlorosilane, phenylmethyldichlorosilane, and a combination thereof and a silane compound selected from the group consisting of 3-glycidoxypropyl trimethoxy silane, 3-glycidoxypropyl triethoxy silane, 3-glycidoxypropyl methyldimethoxy silane, 3-glycidoxypropylmethyldiethoxy silane, 2-(3,4-epoxycyclohexyl)ethyl trimethoxy silane, 2-(3,4-epoxycyclohexyl)ethyl triethoxy silane, dimethyldimethoxy silane, dimethyldiethoxy silane, and a combination thereof.

The coating composition is prepared through a siloxane binder formed through a silane compound containing a phenyl group and a silane compound containing an epoxy group or a dimethyl group to obtain flexibility.

In addition, the siloxane binder may further contain a methyl group to maintain greater flexibility of the coating layer.

In order to further include such a methyl group in the siloxane binder, either or both methyltrimethoxysilane or/and methyltriethoxysilane may be further included to prepare a siloxane binder.

In addition, tetraethoxysilane may be further added to the silane compound as described above for reaction to prepare a siloxane binder, and the including of tetraethoxysilane facilitates an increase in molecular weight of a binder, and further improve room temperature curing properties. That is, curing is accelerating at room temperature, and a surface hardness of the film formed after curing may also be satisfactory.

Meanwhile, the phosphorus-based flame retardant included in the coating composition provided in the invention may be a phosphoric acid ester compound. The phosphoric acid ester compound has a flame-retardant mechanism both in a solid phase and in a gas phase, and accordingly, flame-retardant effects may be effectively obtained.

In addition, in the coating composition provided in the invention, the phosphorus-based flame retardant may be added in a weight of 100 to 300% with respect to a solid weight of the siloxane binder.

In the coating composition provided in the invention, the phosphorus-based flame retardant is required to be added in an amount above a certain level relative to the siloxane binder to make curing at room temperature work well and to obtain effective flame-retardant properties. When the weight of the phosphorus-based flame retardant is less than 100% relative to the weight of the siloxane binder, effective and reproducible flame-retardant properties may hardly be obtained. In addition, when the weight of the phosphorus-based flame retardant is greater than 300% relative to the weight of the siloxane binder, a coating composition may not be cured well, and hardness and flexibility of a film may not be high after curing. Therefore, preferably, the weight of the phosphorus-based flame retardant may be 100 to 300%, more preferably 150 to 250%, relative to the weight of the siloxane binder.

In this case, solid content weight of the siloxane binder may be determined by measuring a weight ratio of solid content contained in a siloxane binder solution. The siloxane binder solution is kept in a high-temperature oven for a long period of time to completely evaporate a solvent, and the remaining solid content is weighed to determine a weight ratio of solid in the siloxane binder solution so as to calculate weight of solid contained in the siloxane binder.

In addition, in the coating composition provided in the invention, the siloxane binder may be acidic.

The acidic siloxane binder may facilitate curing at room temperature. Preferably, the acidic siloxane binder has a pH of 3 to 6. When the pH is too low, it may be hard to handle or may cause damage to a coating object, and when the pH is too high, there is no significant difference in curing speed between neutral and basic.

In the invention, such a coating composition is applied onto an object and cured to provide a flame-retardant product having a flame-retardant flexible coating layer. The flame-retardant product may have both high surface hardness and exhibit excellent flame-retardant properties to be used in various fields of application.

In particular, the flame-retardant flexible coating layer formed through the coating composition according to the invention has flexibility and low-temperature curing properties, and thus is suitable to apply to products that are easily deformed at high temperature such as films and require flexibility.

In addition, a method for manufacturing a flame-retardant product may include (a) mixing a silane compound containing at least any one of an epoxy group or a dimethyl group and a phenyl group with a first solvent to prepare a silane solution, (b) heating the silane solution to prepare a first oligomer solution, (c) diluting the first oligomer solution with a second solvent to prepare a siloxane binder, (d) dissolving or mixing a phosphorus-based flame retardant in/with the siloxane binder to prepare a coating composition, and (e) applying the coating composition onto an object and curing the applied composition.

A silane solution is prepared and then heated and diluted to prepare a siloxane binder first. In this case, a phosphorus-based flame retardant is dissolved or mixed in/with the siloxane binder to prepare a coating composition. The coating composition thus prepared is applied onto a surface of a product to be provided with flame retardancy and cured to manufacture a flame-retardant product having a flame-retardant flexible coating layer formed therein.

When the silane solution is acidic, the curing temperature may be lowered, and to this end, acid may be added in the step (a) to make the silane solution acidic.

Meanwhile, the curing may be performed through hot air drying at room temperature or 100° C. or less. The coating layer is cured through hot air drying at room temperature or a relatively low temperature of 100° C. or less, and accordingly, a flame-retardant flexible coating layer may be formed on surfaces of various products.

Hereinafter, preferred embodiments of the invention will be described to make sure that the invention is sufficiently understood.

The embodiments of the invention are provided to describe the invention more completely understandable to those skilled in the art, and the following embodiments may be modified in various forms and the scope of the invention is limited to the embodiments described below. Rather, these embodiments are provided so that this disclosure will be thorough and complete, and will fully convey the inventive concept to one of ordinary skill in the art.

Example 1

Preparation of Binder 125.4 g of phenyltrimethoxysilane, 50.6 g of methyltriethoxysilane, 43.5 g of 3-glycidoxypropyltrimethoxysilane, 30.2 g of tetraethoxysilane, and 250 g of isopropanol were put into a three neck flask provided with a heating device, and the mixture was stirred while a solution in which 2 ml of nitric acid at a concentration of 0.01 mol/liter and 46 ml of pure water were mixed was added dropwise for 30 minutes using filter paper from a funnel installed in the flask.

After the temperature of a resulting product in the flask reached 50° C. or less, a reflux condenser was installed and the resulting product was heated and refluxed at normal pressure for 12 hours to obtain a siloxane binder solution.

This binder solution was collected and diluted with tetrahydrofuran, and a weight average molecular weight was measured using tetrahydrofuran as a carrier through a gel permeation chromatography instrument provided with a refractive index detector to be determined to be about 1,800.

Preparation of Coating Composition

A phosphoric acid ester-based flame retardant was added in a weight of 100% and 200% relative to weight of solid content of the binder to the synthesized siloxane binder solution, and mixed to prepare a coating composition. The weight of solid content of the binder was determined through weight of the remaining solid content after keeping the binder solution in an oven having an internal temperature of 100° C. for 12 hours.

Formation of Coating Layer

The coating composition thus prepared was applied onto a foaming film having a thickness of 200 to 3,000 μm with a bar coater, dried using a dryer for about 10 seconds, and cured at room temperature to form a film. The coating layer showed a different thickness depending on the bar coater, but was set to have an average thickness between 10 and 20 μm to be applied on both sides of the film.

For the coated film, flame retardancy tests were performed according to certification methods of UL94 V-2, V-1, V-0, and V5. In addition, as for flexibility tests, the coated film was bent to visually check whether there was peeling of the coating layer.

Example 2

Preparation of Binder 125.4 g of phenyltrimethoxysilane, 50.6 g of methyltriethoxysilane, 19.5 g of 3-glycidoxypropyltrimethoxysilane, 30.2 g of tetraethoxysilane, and 220 g of isopropanol were put into a three neck flask provided with a heating device, and the mixture was stirred while a solution in which 2 ml of nitric acid at a concentration of 0.01 mol/liter and 46 ml of pure water were mixed was added dropwise for 30 minutes using filter paper from a funnel installed in the flask.

After the temperature of a resulting product in the flask reached 50° C. or less, a reflux condenser was installed and the resulting product was heated and refluxed at normal pressure for 12 hours to obtain a siloxane binder solution containing a phenyl group.

This binder solution was collected and diluted with tetrahydrofuran, and a weight average molecular weight was measured using tetrahydrofuran as a carrier through a gel permeation chromatography instrument provided with a refractive index detector to be determined to be about 1,600.

Preparation of Coating Composition and Formation of Coating Layer

A coating composition was prepared in the same manner as in Example 1 and then coating composition was used to form a coating layer on a film to determine flame retardancy and flexibility.

Example 3

Preparation of Binder 50.4 g of phenyltrimethoxysilane, 55.6 g of methyltriethoxysilane, 11.5 g of dimethyldimethoxysilane, 45.2 g of tetraethoxysilane, and 200 g of isopropanol were put into a three neck flask provided with a heating device, and the mixture was stirred while a solution in which 2 ml of nitric acid at a concentration of 0.01 mol/liter and 49 ml of pure water were mixed was added dropwise for 30 minutes using filter paper from a funnel installed in the flask.

After the temperature of a resulting product in the flask reached 50° C. or less, a reflux condenser was installed and the resulting product was heated and refluxed at normal pressure for 12 hours to obtain a siloxane binder solution containing a phenyl group.

This binder solution was collected and diluted with tetrahydrofuran, and a weight average molecular weight was measured using tetrahydrofuran as a carrier through a gel permeation chromatography instrument provided with a refractive index detector to be determined to be about 1,900.

Preparation of Coating Composition and Formation of Coating Layer

A coating composition was prepared in the same manner as in Example 1 and then coating composition was used to form a coating layer on a film to determine flame retardancy and flexibility.

Example 4

Preparation of Binder 99.2 g of phenyltrimethoxysilane, 25.6 g of methyltriethoxysilane, 20.5 g of dimethyldimethoxysilane, 25.2 g of tetraethoxysilane, and 170 g of isopropanol were put into a three neck flask provided with a heating device, and the mixture was stirred while a solution in which 2 ml of nitric acid at a concentration of 0.01 mol/liter and 43 ml of pure water were mixed was added dropwise for 30 minutes using filter paper from a funnel installed in the flask.

After the temperature of a resulting product in the flask reached 50° C. or less, a reflux condenser was installed and the resulting product was heated and refluxed at normal pressure for 12 hours to obtain a siloxane binder solution containing a phenyl group.

This binder solution was collected and diluted with tetrahydrofuran, and a weight average molecular weight was measured using tetrahydrofuran as a carrier through a gel permeation chromatography instrument provided with a refractive index detector to be determined to be about 1,700.

Preparation of Coating Composition and Formation of Coating Layer

A coating composition was prepared in the same manner as in Example 1 and then coating composition was used to form a coating layer on a film to determine flame retardancy and flexibility.

Example 5

Preparation of Binder 99.2 g of phenyltrimethoxysilane, 39.5 g of methyltriethoxysilane, 21.5 g of dimethyldimethoxysilane, and 160 g of isopropanol were put into a three neck flask provided with a heating device, and the mixture was stirred while a solution in which 2 ml of nitric acid at a concentration of 0.01 mol/liter and 43 ml of pure water were mixed was added dropwise for 30 minutes using filter paper from a funnel installed in the flask.

After the temperature of a resulting product in the flask reached 50° C. or less, a reflux condenser was installed and the resulting product was heated and refluxed at normal pressure for 12 hours to obtain a siloxane binder solution containing a phenyl group.

This binder solution was collected and diluted with tetrahydrofuran, and a weight average molecular weight was measured using tetrahydrofuran as a carrier through a gel permeation chromatography instrument provided with a refractive index detector to be determined to be about 1,600.

Preparation of Coating Composition and Formation of Coating Layer

A coating composition was prepared in the same manner as in Example 1 and then coating composition was used to form a coating layer on a film to determine flame retardancy and flexibility.

Example 6

Preparation of Binder 57.5 g of phenyltrimethoxysilane, 25.7 g of methyltriethoxysilane, 55.5 g of dimethyldimethoxysilane, and 130 g of isopropanol were put into a three neck flask provided with a heating device, and the mixture was stirred while a solution in which 2 ml of nitric acid at a concentration of 0.01 mol/liter and 37 ml of pure water were mixed was added dropwise for 30 minutes using filter paper from a funnel installed in the flask.

After the temperature of a resulting product in the flask reached 50° C. or less, a reflux condenser was installed and the resulting product was heated and refluxed at normal pressure for 12 hours to obtain a siloxane binder solution containing a phenyl group.

This binder solution was collected and diluted with tetrahydrofuran, and a weight average molecular weight was measured using tetrahydrofuran as a carrier through a gel permeation chromatography instrument provided with a refractive index detector to be determined to be about 1,500.

Preparation of Coating Composition and Formation of Coating Layer

A coating composition was prepared in the same manner as in Example 1 and then coating composition was used to form a coating layer on a film to determine flame retardancy and flexibility.

Comparative Example 1

Preparation of Binder 23.2 g of phenyltrimethoxysilane, 60.4 g of methyltriethoxysilane, 22.4 g of tetraethoxysilane, and 100 g of isopropanol were put into a three neck flask provided with a heating device, and the mixture was stirred while a solution in which 2 ml of nitric acid at a concentration of 0.01 mol/liter and 41 ml of pure water were mixed was added dropwise for 30 minutes using filter paper from a funnel installed in the flask.

After the temperature of a resulting product in the flask reached 50° C. or less, a reflux condenser was installed and the resulting product was heated and refluxed at normal pressure for 12 hours to obtain a siloxane binder solution containing a phenyl group.

This binder solution was collected and diluted with tetrahydrofuran, and a weight average molecular weight was measured using tetrahydrofuran as a carrier through a gel permeation chromatography instrument provided with a refractive index detector to be determined to be about 1,800.

Preparation of Coating Composition and Formation of Coating Layer

A coating composition was prepared in the same manner as in Example 1 and then coating composition was used to form a coating layer on a film to determine flame retardancy and flexibility.

Comparative Example 2

Preparation of Binder 80.3 g of vinyltriethoxysilane, 75.6 g of methyltriethoxysilane, 22.4 g of tetraethoxysilane, and 170 g of isopropanol were put into a three neck flask provided with a heating device, and the mixture was stirred while a solution in which 2 ml of nitric acid at a concentration of 0.01 mol/liter and 43 ml of pure water were mixed was added dropwise for 30 minutes using filter paper from a funnel installed in the flask.

After the temperature of a resulting product in the flask reached 50° C. or less, a reflux condenser was installed and the resulting product was heated and refluxed at normal pressure for 12 hours to obtain a siloxane binder solution containing a phenyl group.

This binder solution was collected and diluted with tetrahydrofuran, and a weight average molecular weight was measured using tetrahydrofuran as a carrier through a gel permeation chromatography instrument provided with a refractive index detector to be determined to be about 1,900.

Preparation of Coating Composition and Formation of Coating Layer

A coating composition was prepared in the same manner as in Example 1 and then coating composition was used to form a coating layer on a film to determine flame retardancy and flexibility.

Comparative Example 3

Preparation of Binder 58.5 g of phenyltrimethoxysilane, 68.3 g of vinyltriethoxysilane, 22.4 g of tetraethoxysilane, and 140 g of isopropanol were put into a three neck flask provided with a heating device, and the mixture was stirred while a solution in which 2 ml of nitric acid at a concentration of 0.01 mol/liter and 42 ml of pure water were mixed was added dropwise for 30 minutes using filter paper from a funnel installed in the flask.

After the temperature of a resulting product in the flask reached 50° C. or less, a reflux condenser was installed and the resulting product was heated and refluxed at normal pressure for 12 hours to obtain a siloxane binder solution containing a phenyl group.

This binder solution was collected and diluted with tetrahydrofuran, and a weight average molecular weight was measured using tetrahydrofuran as a carrier through a gel permeation chromatography instrument provided with a refractive index detector to be determined to be about 1,600.

Preparation of Coating Composition and Formation of Coating Layer

A coating composition was prepared in the same manner as in Example 1 and then coating composition was used to form a coating layer on a film to determine flame retardancy and flexibility.

Comparative Example 4

A coating composition and a film were prepared in the same manner as in Example 1, using generally used typical acrylic binders and retardancy and flexibility were determined.

Comparative Example 5

A coating composition and a film were prepared in the same manner as in Example 1, using generally used typical epoxy-based binders and retardancy and flexibility were determined.

The flame retardancy and flexibility test results for the films formed through Examples 1 to 6 and Comparative Examples 1 to 5 are shown in the following table.

TABLE 1

| | 100% addition of flame retardant | 200% addition of flame retardant | Flexibility | Surface upon bending |
|---|---|---|---|---|
| Example 1 | V-0 | V-0 | OK | Satisfactory coating layer, no powder generated |
| Example 2 | V-0 | V-0 | OK | Satisfactory coating layer, no powder generated |
| Example 3 | V-0 | V-0 | OK | Satisfactory coating layer, no powder generated |
| Example 4 | V-1 | V-1 | OK | Tackiness |
| Example 5 | V-1 | V-1 | OK | Tackiness |
| Example 6 | V-1 | V-1 | OK | Tackiness |
| Comparative Example 1 | NG | V-2 | NG | Powder fall |
| Comparative Example 2 | NG | NG | NG | Powder fall |
| Comparative Example 3 | NG | V-2 | NG | Powder fall |
| Comparative Example 4 | NG | NG | OK | Tackiness |
| Comparative Example 5 | NG | NG | OK | Tackiness |

As shown in the flame retardancy test results shown in the table above, Examples 1 to 6 according to the invention obtained stable flame retardancy, but Comparative Examples 1 to 5, despite the addition of a flame retardant, failed to obtain flame retardancy. In addition, Comparative Examples 1 to 3 failed to satisfy the flexibility tests of the film.

Products having excellent flame-retardant properties and maintaining flexibility by forming a flame-retardant flexible coating layer onto a surface of various products through a flame-retardant flexible coating composition according to the invention may be provided.

In addition, the flame-retardant coating composition according to the invention may be curable at a relatively low temperature to provide flame retardancy to various products.

What is claimed is:

1. A flame-retardant flexible coating composition comprising:

a siloxane binder comprising an epoxy group, a dimethylsiloxane unit, a phenyl group, and a tetraethoxysilane-derived siloxane unit; and a phosphorus-based flame retardant, wherein the phosphorus-based flame retardant is added in a weight of 100 to 300% with respect to a solid weight of the siloxane binder, and wherein the siloxane binder is acidic.

2. The flame-retardant flexible coating composition according to claim 1, wherein the siloxane binder further comprises a methylsiloxane unit.

3. The flame-retardant flexible coating composition according to claim 1, wherein the siloxane binder comprises siloxane units derived from:

a silane compound selected from the group consisting of phenylsilane, phenylmethylsilane, phenyltrimethoxysilane, phenyltriethoxysilane, diphenyldimethoxysilane, diphenyldiethoxysilane, diphenylsilanediol, triphenylsilanol, phenylmethyldimethoxysilane, phenylmethyldiethoxysilane, phenyltrichlorosilane, diphenyldichlorosilane, triphenylchlorosilane, phenylmethyldichlorosilane, and a combination thereof;

a silane compound selected from the group consisting of 3-glycidoxypropyl trimethoxy silane, 3-glycidoxypropyl triethoxy silane, 3-glycidoxypropyl methyldimethoxy silane, 3-glycidoxypropylmethyldiethoxy silane, 2-(3,4-epoxycyclohexyl)ethyl trimethoxy silane, 2-(3,4-epoxycyclohexyl)ethyl triethoxy silane, and a combination thereof;

a silane compound selected from the group consisting of dimethyldimethoxy silane, dimethyldiethoxy silane, and a combination thereof; and tetraethoxysilane.

4. The flame-retardant flexible coating composition according to claim 2, wherein the methylsiloxane unit is derived from a silane compound selected from the group consisting of methyltrimethoxysilane, methyltriethoxysilane, and a combination thereof.

5. The flame-retardant flexible coating composition according to claim 1, wherein the phosphorus-based flame retardant is a phosphoric acid ester compound.

6. The flame-retardant flexible coating composition according to claim 1, wherein the siloxane binder has a pH of 3 to 6.

7. A flame-retardant product having a flame-retardant flexible coating layer which is formed by applying the flame-retardant coating composition according to claim 1 onto a surface and curing the applied composition.

8. The flame-retardant product according to claim 7, wherein the flame-retardant product having the flame-retardant flexible coating layer is a film.

9. A method for manufacturing a flame-retardant product, the method comprising:

(a) mixing a silane compound comprising an epoxy group, a dimethyl group, a phenyl group and tetraethoxysilane with a first solvent to prepare a silane solution;

(b) heating the silane solution to prepare a first oligomer solution;

(c) diluting the first oligomer solution with a second solvent to prepare a siloxane binder;

(d) dissolving or mixing a phosphorus-based flame retardant in/with the siloxane binder in a weight of 100 to 300% with respect to a solid weight of the siloxane binder to prepare a coating composition; and (e) applying the coating composition onto an object and curing the applied composition either at room temperature or through hot air drying at 100° C. or less, wherein in the step (a), acid is added to make the silane solution acidic.

* * * * *